UNITED STATES PATENT OFFICE.

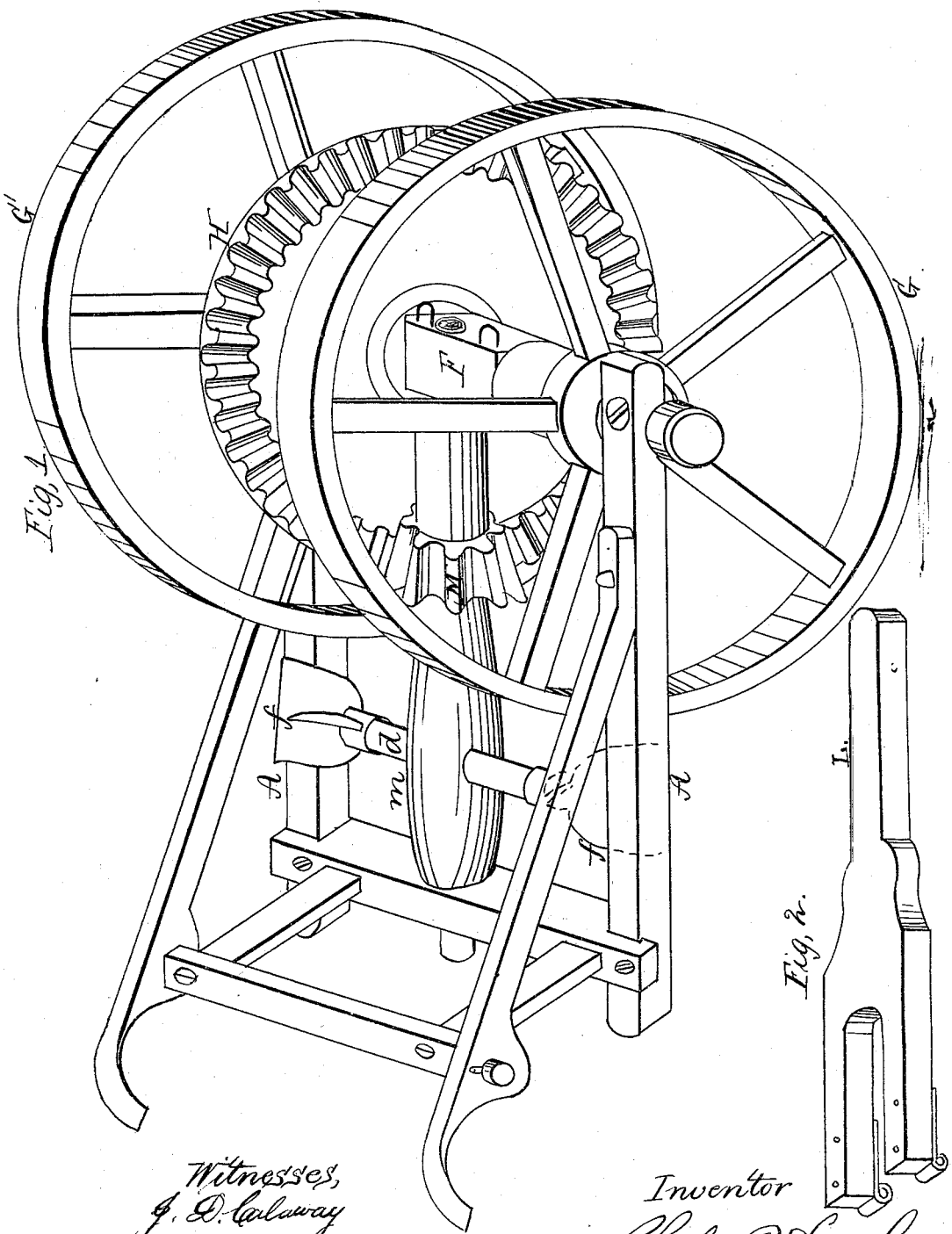

CHARLES B. DOUGLAS, OF MONTGOMERY, ALABAMA.

IMPROVEMENT IN COTTON-CHOPPERS.

Specification forming part of Letters Patent No. 113,640, dated April 11, 1871.

*To all whom it may concern:*

Be it known that I, CHARLES B. DOUGLAS, of Montgomery, in the county of Montgomery and State of Alabama, have invented certain new and useful Improvements in Cotton-Choppers; and I do hereby declare the following to be a full, clear, and exact description thereof, reference being had to the accompanying drawings, and to the letters of reference marked thereon, forming part of this specification, and in which—

Figure 1 represents a perspective view of my machine, and Fig. 2 a side view of the tongue.

The nature of my invention consists in the construction and arrangement of the devices whereby the cotton-chopper is thrown in and out of gear, so as to make the chopper revolve or not, as may be desired.

A represents the frame of my machine, through the front end of which passes the axle F, which is stationary, and has the tongue L attached by any suitable means in its center.

$m$ is a shaft placed at right angles with the axle F, and having its bearings in said axle and in the rear cross-bar of the frame. Through the shaft $m$, and at right angles with it, pass the arms $d\ d$, to the outer ends of which the hoes $ff$ are firmly secured. These arms and hoes, which form the chopper, are revolved in the following manner: Upon the axle are placed two driving-wheels, G and G', one of which, G', is provided with an elongated hub. On this elongated hub is placed a bevel cog-wheel, H, and secured by a set-screw. This wheel gears with a pinion, $n$, on the shaft $m$, and thus contributes the required rotary motion to the chopper. When the set-screw securing the bevel cog-wheel H is loosened, said wheel may be slid upon the elongated hub of the wheel G', so as not to gear with the pinion $n$, and thus stop the motion of the chopper.

Having thus fully described my invention, what I claim as new, and desire to secure by Letters Patent, is—

The combination of the frame A, axle F, driving-wheels G G', the latter with an elongated hub, the bevel cog-wheel H, sliding upon said elongated hub, the pinion $n$, shaft $m$, arms $d\ d$, and hoes $ff$, all constructed and arranged as and for the purpose set forth.

In testimony that I claim the foregoing as my own invention I affix my signature in presence of two witnesses.

CHARLES BRYANT DOUGLAS.

Witnesses:
J. D. CALAWAY,
W. H. PENNINGTON.